United States Patent [19]

Howe et al.

[11] Patent Number: 4,644,654

[45] Date of Patent: Feb. 24, 1987

[54] TREE TRIMMING APPARATUS

[76] Inventors: Ernie W. Howe, 6627 Rochester St., NE.; Stanley C. Howe, 10500 - 86th Ave. NE., both of Brooks, Oreg. 97305

[21] Appl. No.: 779,622

[22] Filed: Sep. 24, 1985

Related U.S. Application Data

[63] Continuation-in-part of Ser. No. 709,330, Mar. 7, 1985, abandoned.

[51] Int. Cl.⁴ ............................................. B26B 27/00
[52] U.S. Cl. .................................... 30/296 R; 30/210; 56/233; 224/262
[58] Field of Search ..................... 30/210, 231, 296 R; 224/185, 262; 56/233

[56] References Cited

U.S. PATENT DOCUMENTS 2,277,080  3/1942  Davis ................................ 30/210 X
3,219,129  11/1965  Yamada ........................ 30/296 R X
4,483,070  11/1984  Junkermann ..................... 30/296 R

*Primary Examiner*—Douglas D. Watts
*Attorney, Agent, or Firm*—James D. Givnan, Jr.

[57] ABSTRACT

A cutter bar assembly is suspended from an overhead arm carried by an operator mounted back pack structure. A flexible coupling carries the cutter bar assembly in a manner causing the assembly to assume a position inclined from the vertical for the trimming of Christmas trees. An engine and transmission are mounted on the cutter bar assembly with motion being imparted to the cutter blades by angular connector plates. A handlebar is attached to the cutter bar assembly in a manner offsetting the latter to one side of the operator for minimal operator contact with the vegetation being trimmed. A modified form includes an engine on the back pack with a flexible drive line to a transmission in place on the cutter bar assembly. Engine controls are in place on a drive shaft coupling.

12 Claims, 6 Drawing Figures

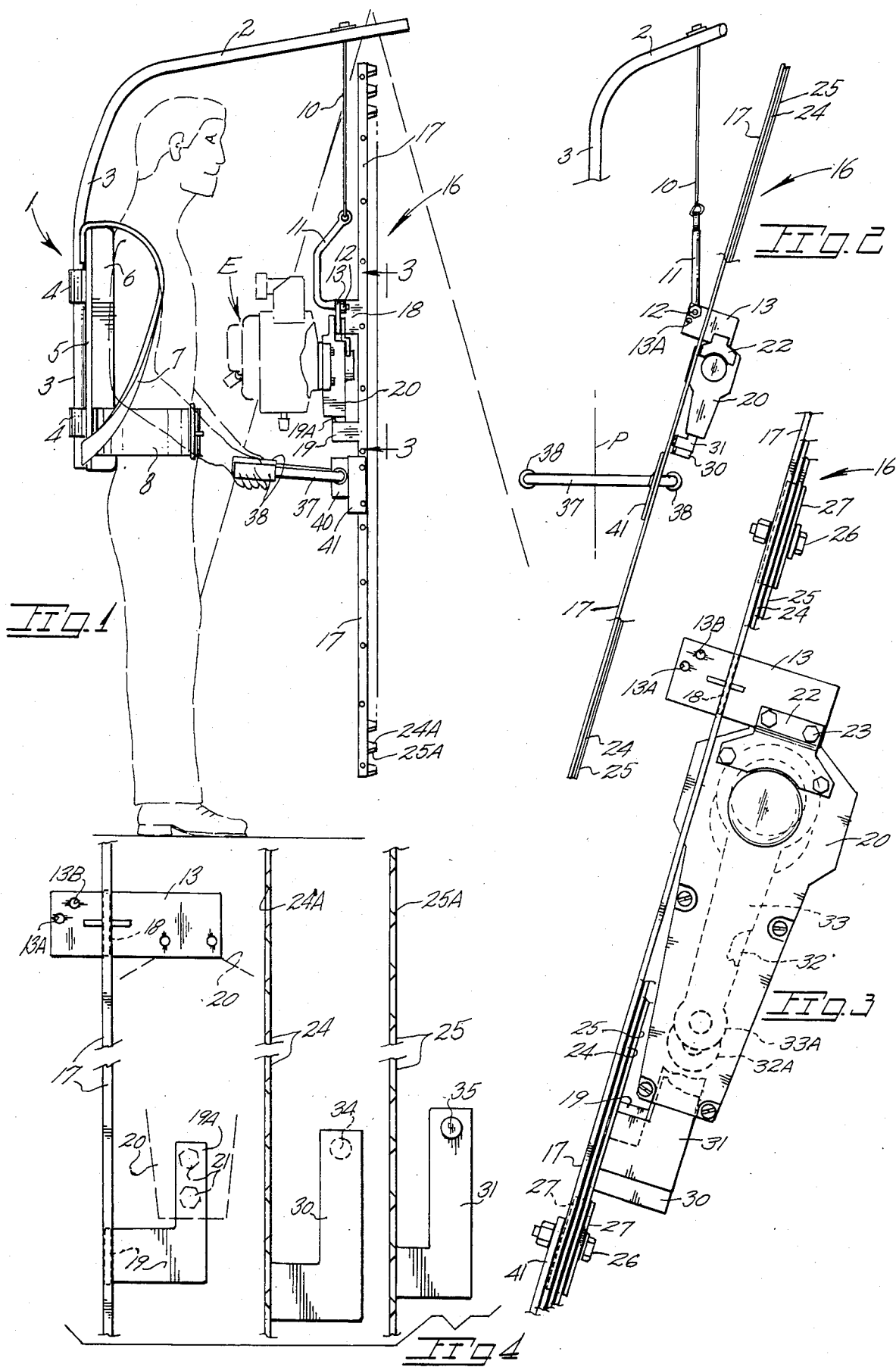

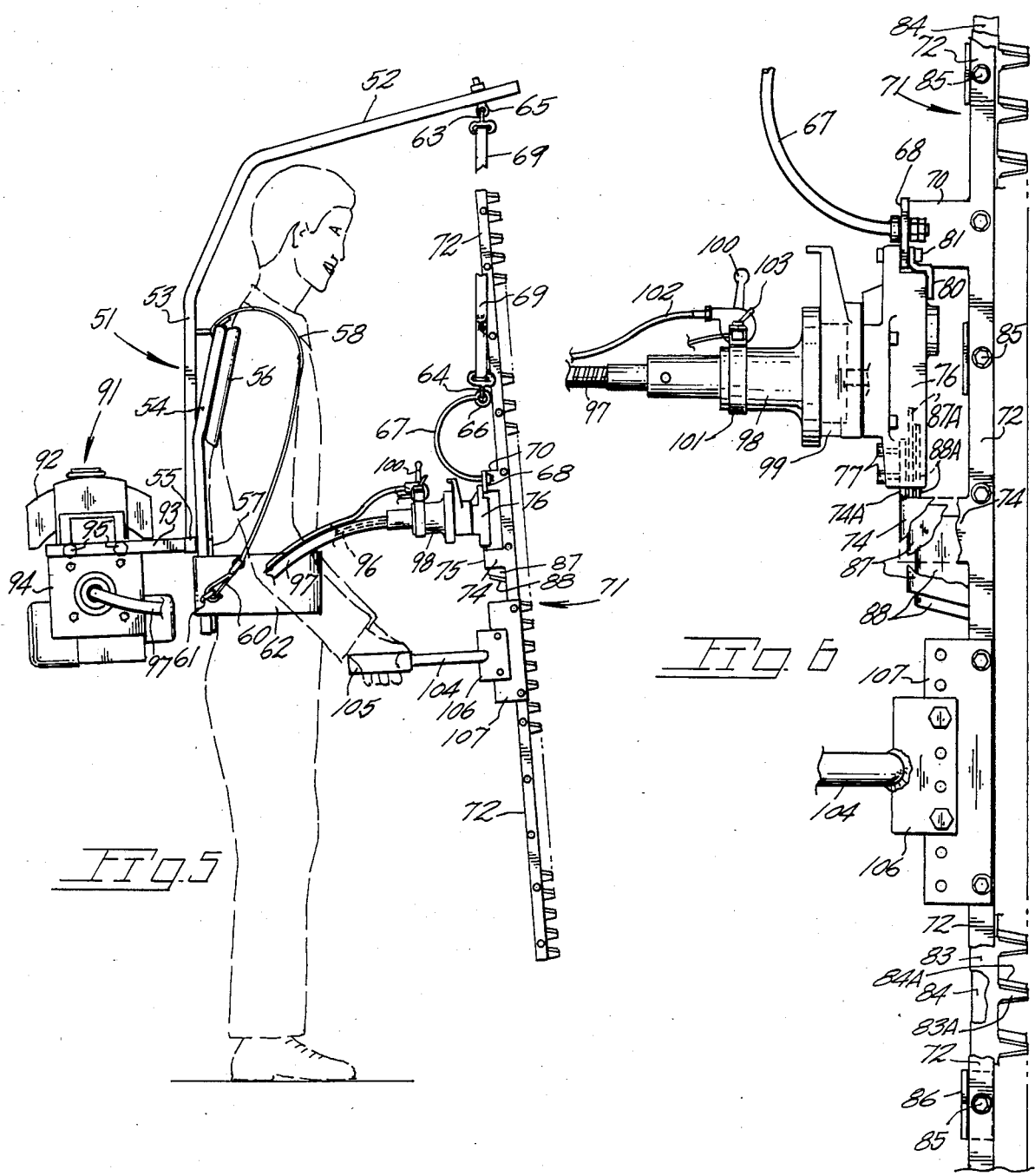

TREE TRIMMING APPARATUS

The present application is a continuation-in-part patent application of a co-pending earlier application filed by the same inventors on Mar. 7, 1985, under U.S. patent application Ser. No. 06/709,330 and having the same title as the present application and now abandoned.

BACKGROUND OF THE INVENTION

The present invention concerns powered equipment for the trimming of trees, shrubs and other vegetation.

Commercial growers of Christmas trees must periodically trim same to justify a premium selling price. Currently the shaping of Christmas trees is done with a hand held knife which requires a degree of skill on the users part. The trimming of trees with a knife is objectionable additionally from a standpoint of the time required to properly shape each tree. The wielding of a sizable knife over a period of several hours during a working day ofttimes results in careless trimming particularly when affected by fatigue. An additional drawback, of course, is the risk of injury to a person involved in such work.

SUMMARY OF THE PRESENT INVENTION

The present invention is embodied within a tree trimming apparatus suspended in an inclined manner so as to trim the tree in a desired shape.

The present apparatus includes, in one form of the invention, an elongate cutter bar assembly powered by a lightweight engine in place on a stationary component of the cutter bar assembly. The cutter bar assembly is suspended in an upright, inclined manner to preclude tiresome positioning of same by the operator. A handlebar component on the cutter bar assembly permits the operator to stabilize the cutter bar during a tree trimming operation. An overhead support may be part of a back pack structure worn by the operator. The cutter bar assembly is preferably located in an offset manner to permit the operator to avoid obstructing contact with the vegetation.

Objectives of the present invention include the provision of a powered tree trimming apparatus which permits an operator to properly shear a typical Christmas tree in about ten seconds and accordingly over 2000 trees during a work shift; the provision of a powered tree trimming apparatus which requires no trimming skill on the operator's part as the apparatus is suspended in an inclined manner to provide the desired conical tree shape; the provision of a powered tree trimming apparatus including a back pack type harness having an overhead support member from which a cutter bar assembly is suspended with virtually all loads being imparted to the operator's torso; the provision of a powered tree trimming apparatus having a lightweight, two cycle engine mounted in place on a cutter bar and driving transmission housed eccentric means which reciprocates the blades slidably mounted on the cutter bar; the provision of a powered tree trimming apparatus wherein a cutter bar assembly is positioned in both an inclined and an offset manner relative an apparatus handlebar to provide both desired cutter bar assembly inclination for tree taper and to enable the operator to substantially avoid contact with the tree being trimmed; the provision of a powered tree trimming apparatus maneuverable in close quarters to permit the Christmas tree grower to grow trees in a high density manner for better utilization of available acreage; the provision of a powered tree trimming apparatus which trims a Christmas tree to the desired conical shape in one pass about the tree; the provision of a modified powered tree trimming apparatus wherein the engine is mounted on the back pack frame with a flexible drive line coupled at its remote end to a transmission mounted in place on a cutter bar assembly.

BRIEF DESCRIPTION OF THE DRAWINGS

In the drawing

FIG. 1 is a side elevational view of the present tree trimming apparatus in use;

FIG. 2 is an elevational view thereof taken from the right side of FIG. 1;

FIG. 3 is a vertical sectional view taken along line 3—3 of FIG. 1 with blade members broken away from the cutter bar;

FIG. 4 is an exploded view of the cutter bar and blades removed from the transmission housing;

FIG. 5 is a side elevational view of a modified tree trimming apparatus; and

FIG. 6 is an enlarged fragmentary view of a portion of the cutter bar assembly of the modified apparatus with the transmission thereon.

DETAILED DESCRIPTION OF THE PREFERRED EMBODIMENTS

With continuing attention to the drawing, reference numerals indicate features hereinafter similarly identified the reference numeral 1 indicates generally a back pack type structure of an elevated support assembly.

The support assembly additionally includes an elevated arm 2 projecting forwardly above the operator's head. A downwardly extending segment 3 is suitably secured at 4 to a back pack base 5. The back pack type structure includes a padded component 6 held in place against the operator's back by shoulder straps as at 7. A belt 8 extends from the back pack base 5 about the operator's lower torso and is equipped with a buckle. Accordingly, elevated support arm 2 is conveniently held in place with the forwardly extending portion thereof canted toward users left side. Elongate flexible means at 10 extends downwardly from arm 2 and terminates in attachment to a hanger rod 11 which in turn terminates in fastener attachment at 12 with attachment means shown as a plate 13 of a cutter bar assembly at 16. Plate, 13 preferably defines multiple openings 13A–13B laterally offset different distances from a cutter bar 17 of a cutter bar assembly 16 and from a plane containing the cutter bar assembly center of gravity to cause the assembly to be suspended in upright fashion and at a selected inclination as that typically shown in FIG. 2. The apertures 13A–13B in plate 13 permit selective attachment of the end of rod 11 thereto to provide for suspending the cutter bar assembly in more than one inclined relationship to the vertical to enable adapting the apparatus to cutting trees in different conical shapes. For the trimming trees so as to have a base diameter equal to 60 percent of tree height, the cutter bar assembly will be about 17 degress off the vertical.

The cutter bar assembly indicated generally at 16 includes earlier noted stationary cutter bar 17. Plate 13 is secured to the cutter bar by a bracket 18. Cutter bar 17 is additionally equipped with a second bracket 19 (FIGS. 3 and 4) which extends rearwardly from the cutter bar and thence right angularly. An extension at 19A of the bracket terminates upwardly within a transmission unit 20 whereat the bracket extension is in bolted securement at 21 to the transmission interior. The upper end of the transmission receives a mounting bracket 22 which is secured by fasteners 23 to plate 13. Accordingly, the transmission, and an engine indicated generally at E in place on the transmission, are secured in place to the cutter bar. One suitable engine and transmission unit is that sold under the trademark ECHO, model HC-210E which unit includes a centrifugal clutch. The transmission is modified somewhat as later described.

The cutter bar assembly includes slidably mounted reciprocating blades 24-25 with each blade having a series of slots through which pass fastener assemblies 26 carried by fixed cutter bar 17. Angle shaped guides at 27 additionally support the blades at each fastener assembly. The pair of cutter blades are coextensive with cutter bar 17 and include coacting teeth 24A-25A. Reciprocating motion is imparted to the cutter blades 24-25 by angular connector plates at 30 and 31 which, as shown in FIGS. 3 and 4, terminate within transmission 20. Each connector plate 30 and 31 initially extends rearwardly in the plane of its cutter blade 24-25 and thence laterally and thence projects upwardly for engagement with transmission components as hereinafter described. The present connector plates 30-31 are substituted for the original, reciprocating components of the transmission.

Transmission 20 includes a pair of connecting rods 32-33 each carried by an eccentric on a driven shaft 36. The connecting rods 32-33 have bosses 32A-33A at their distal ends in which are received posts 34-35 on the blade attached connector plates 30-31. Internal transmission structure slidably confines the connector plates to rectilinear motion. Accordingly blades 24 and 25 are oppositely reciprocated along cutter bar 17.

Stabilizing means as shown as a handlebar at 37 is provided with a pair of handgrips 38. A bracket 40 secured in place offset toward one end (preferably the left side) of the handlebar to enable the operator to substantially avoid contact with the foilage being trimmed. Preferably the bracket 40 is asymetrically mounted on a curved segment at one side of the handlebar so as to position the cutter bar 17 so as to be rotated outwardly about its major axis at about a thirty degree included angle away from a vertical medial plane P of the operator to provide an optimum cutting angle with the branch being cut. To enable handlebar height to be varied to suit the operator, bracket 40 is attachable to a mounting plate 41 having a series of apertures with the plate secured to cutter bar 17 by a pair of the fastener assemblies 26.

For the operator's convenience, a throttle control and an ignition grounding switch are provided on handlebar 37. Transmission 20 has a five-to-one reduction drive. The cutter bar assembly preferably has a length of about six or seven feet.

The prepferred form of the trimming apparatus modification shown in FIG. 5 utilizes several components in common with the first described form of the trimmer. Reference numeral 51 indicates generally a modified back pack structure of an elevated support assembly which includes an elevated support arm 52 having a downwardly extending segment 53 welded to a tubular back pack frame 54. A frame cross member 55 is secured to parallel legs of frame 54. A cushion 56 on the frame bears upon the user's upper torso while a plate 57 on the frame distributes loads across the wearer's lower back. Adjustable shoulder straps as at 58 extend from the frame upper portion and terminate downwardly in snap hooks as at 60 which pass through frame mounted eyes 61. A buckle equipped belt 62 passes about the lower extremities of the parallel legs of the frame and is held thereon by eyes 61.

As in the first described form of the trimmer, support arm 52 is directed forwardly in an oblique or canted manner so as to locate a later described suspended cutter bar assembly forwardly offset to one side of the user. Elongate coupling means at 69 may be an adjustable strap fitted with hooks 63-64 for passage through an arm mounted eye 65 and the eye 66 of a hanger rod 67. Rod 67 passes, at its lower end, pivotally through a plate 68 which is mounted crosswise on bracket means at 70 which in turn is secured to a stationary cutter bar 72 of an uprightly disposed cutter bar assembly generally at 71. Plate 68 defines multiple openings offset in the manner of its counterpart in the first described form of the invention for the same purpose of varying cutter bar assembly inclination from the vertical.

Stationary cutter bar 72 carries additional bracket means at 74 which extends rearwardly from the bar and is right angularly bent at 75 to provide an upward extension 74A which extends into a transmission unit 76 whereat fasteners at 77 secure same in place. The upper end of transmission housing 76 carries a bracket 80 which abuts the forward side of plate 68 to receive fasteners as at 81 which also pass through the housing upper end.

The cutter bar assembly 71 includes, in addition to stationary bar 72, reciprocating blades 83-84 which are coextensive with bar 72. The blades are each provided with slots, spaced at intervals, through which pass fastener assemblies 85 carried by fixed cutter bar 72. Angle shaped guides at 86 additionally support the blades at each fastener location. Blade teeth are at 83A-84A. Blades 83-84 are each powered in a reciprocating manner by an angular connector plate 87-88 which, as in the first described form of the invention, initially extend rearwardly from their respective blade and thence extend laterally. Upward plate extensions at 87A-88A extending into a transmission housing for pivotal engagement with the transmission connecting rods as earlier described. The connector plates 87-88 in the present invention are substituted for the original manufactured components of the transmission.

A power source for the modified form of tree trimmer includes an air cooled, two cycle engine indicated generally at 91 which may be of the type earlier identified having a gas tank at 92 and a centrifugal clutch. A rearwardly extending arm 93 of the back pack frame receives an engine mount 94 secured by fasteners 95. The engine driven clutch is coupled to one end of a flexible drive line 96 within a flexible sheath 97. Such engine-clutch combinations are well known and widely utilized in small engine manufacture as are flexible drive lines in combination with such small displacement, two cycle engines. The distal or remaining end of the drive line 96 includes an end fitting 98 within which is journalled an end segment of line 96 which projects forwardly from the fitting and into an adaptor 99 for mating with an input shaft (not shown) of transmission 76. A throttle at 100 is conveniently located on end fitting 98 of the drive line by a clamp 101. A throttle control cable is at 102 terminates at the engine. A kill switch at 103 is similarly mounted for grounding of the engine ignition system.

A handlebar at 104 includes handgrips 105. A bracket 106 is adjustably mounted on a cutter bar mounted plate 107 with the bracket being located on a curved portion of the handlebar. Such mounting of the bracket 106 positions the cutter bar assembly in a plane which intersects a vertical medial plane of the operator for optimum cutting engagement with a tree branch.

While we have shown but a few embodiments of the invention, it will be apparent to those skilled in the art that the invention may be embodied still otherwise without departing from the spirit and scope of the invention.

Having thus described the invention, what is desired to be secured in a Letters Patent is:

1. A tree trimming apparatus comprising in combination,
   an elevated support assembly including a support arm,
   an elongate cutter bar assembly including a cutter bar disposed in upright fashion below said support arm, multiple cutter blades slidably mounted on said cutter bar, a connector plate on each of said blades and imparting reciprocal motion to the blades,
   a power source and transmission for driving said cutter bar assembly, said transmission imparting reciprocal motion to the blades by means of the connector plate on each of said blades,
   elongate means coupling said cutter bar assembly to said support arm in a suspended manner,
   said cutter bar assembly additionally including attachment means located so as to receive one end of said elongate means at a point laterally offset from the cutter assembly center of gravity to cause said cutter bar assembly to be suspended inclined somewhat off the vertical for tree trimming along an inclined course, and stabilizing means on said cutter bar assembly.

2. The trimming apparatus claimed in claim 1 wherein said power source and said transmission are mounted on said cutter bar assembly.

3. The trimming apparatus claimed in claim 1 wherein said stabilizing means is a handlebar having a pair of handgrips, said handlebar asymmetrically mounted on said cutter bar assembly to permit an operator to avoid heavy contact with the tree bing trimmed, a mounting plate on said cutter bar assembly supporting said handlebar in an axially adjustable manner.

4. The trimming apparatus claimed in claim 1 wherein said attachment means is a plate carried by said cutter bar, said plate having at least one aperture therein offset from center of gravity of the cutter bar assembly, said elongate means terminating in attachment to said plate at the aperture therein to cause the cutter bar assembly to be supported in an uprightly inclined manner by said elongate means.

5. The trimming apparatus claimed in claim 1 wherein said elevated support assembly includes a back pack structure for wearby an operator, said support arm extending upwardly and thence extending forwardly from said back pack structure and terminating forwardly of the operator and thereat receiving one end of said elongate means.

6. A tree trimming apparatus comprising,
   an elevated support assembly including a back pack type structure for wear by an operator, a support arm carried by said back pack structure and extending upwardly therefrom and thence forwardly to project over and fowardly of the operator,
   elongate means suspended from said arm,
   a cutter bar assembly carried in upright fashion by said elongate means, attachment means receiving one end of said elongate means at a point laterally offset from the cutter bar assembly so as to cause the cutter bar assembly to be suspended slightly off the vertical for trimming along an inclined course, said cutter bar assembly including a cutter bar, multiple blades slidably carried by said cutter bar,
   a power source and transmission in driving engagement with said cutter bar assembly, brackets mounting said power source and transmission on said cutter bar, connector plates one each on said blades and driven by said transmission to impart reciprocal motion to said blade, said connector plates being of angular configuration, and
   stabilizing means for stabilizing the cutter bar assembly against displacement during a tree trimming operation.

7. The trimming apparatus claimed in claim 6 wherein the forwardly projecting position of said arm is canted to extend over one side of the operator's torso.

8. The trimming apparatus claimed in claim 6 wherein said attachment means is a plate defining multiple apertures for attachment of said elongated means, said apertures offset different distances from the cutter bar assembly center of gravity whereby the cutter bar assembly may be positioned at selected upright positions.

9. The tree trimming apparatus claimed in claim 1 wherein said power source is an engine in place on said elevated support assembly, said transmission including a housing, said cutter bar assembly including bracket means for mounting the transmission housing to the cutter bar assembly, a flexible drive line coupling said engine and said transmission.

10. The tree trimming apparatus claimed in claim 9 wherein said elevated support assembly includes a back pack having a frame, said support arm carried by and extending upwardly from the frame and thence terminating forwardly of said back pack when worn by an operator, said elongate means terminating at one end in attachment to said support arm.

11. The tree trimming apparatus claimed in claim 10 wherein said stabilizing means is a handlebar having end mounted handgrips for grasping by the operator to resist loads encountered during a trimming operation, said handlebar mounted intermediate its ends in an asymmetrical manner to said cutter bar assembly.

12. The tree trimming apparatus claimed in claim 1 wherein each connector plate is of angular configuration.

* * * * *